US006743950B2

(12) United States Patent
Gonzalez et al.

(10) Patent No.: US 6,743,950 B2
(45) Date of Patent: Jun. 1, 2004

(54) PALLADIUM COMPLEX SALT AND USE THEREOF FOR ADJUSTING PALLADIUM CONCENTRATION OF AN ELECTROLYTIC SOLUTION FOR DEPOSIT OF PALLADIUM OR ONE OF ITS ALLOYS

(75) Inventors: José Gonzalez, Bondy (FR); Lionel Chalumeau, Paris (FR); Michel Limayrac, Domont (FR)

(73) Assignee: Metalor Technologies France SAS, Courville sur Eure (FR)

( * ) Notice: Subject to any disclaimer, the term of this patent is extended or adjusted under 35 U.S.C. 154(b) by 0 days.

(21) Appl. No.: 10/239,862

(22) PCT Filed: Apr. 5, 2001

(86) PCT No.: PCT/FR01/01022

§ 371 (c)(1),
(2), (4) Date: Oct. 3, 2002

(87) PCT Pub. No.: WO01/77025

PCT Pub. Date: Oct. 18, 2001

(65) Prior Publication Data

US 2003/0047460 A1 Mar. 13, 2003

(30) Foreign Application Priority Data

Apr. 6, 2000 (FR) .............................................. 00 04382

(51) Int. Cl.$^7$ ...................... C07C 211/00; C25D 3/56; C25D 3/50
(52) U.S. Cl. ...................... 564/463; 205/257; 205/259; 205/265
(58) Field of Search ...................... 564/463; 205/257, 205/259, 265

(56) References Cited

U.S. PATENT DOCUMENTS

| 3,933,602 | A | * | 1/1976 | Henzi et al. ................. 205/257 |
| 4,278,514 | A | * | 7/1981 | Morrissey .................... 205/265 |
| 4,552,628 | A |   | 11/1985 | Wilcox et al. ................. 204/47 |
| 4,673,472 | A |   | 6/1987 | Morrissey et al. .......... 204/44.6 |
| 4,767,507 | A | * | 8/1988 | Wilkinson ................... 205/250 |
| 5,882,736 | A | * | 3/1999 | Stein et al. .................. 427/437 |
| 6,346,222 | B1 | * | 2/2002 | Abys et al. .................... 423/22 |

FOREIGN PATENT DOCUMENTS

| EP | 107308 |   | 5/1984 |
| GB | 1051383 | * | 12/1966 |

* cited by examiner

*Primary Examiner*—Edna Wong
(74) *Attorney, Agent, or Firm*—Dennison, Schultz, Dougherty & MacDonald

(57) ABSTRACT

A novel complex salt off palladium sulfate and ethylenediamine contains 31 to 41% by weight of palladium and has a molar ratio $[SO_4]:[Pd]$ of between 0.9 and 1.15 and a ratio [ethylenediamine ]:[Pd] of between 0.8 and 1.2. The invention further relates to a process for the preparation of this complex salt, and to the use of this complex salt for introducing palladium into an aqueous electrolysis bath of acidic pH for the electrochemical deposition of palladium or one of its alloys, or for adjusting the palladium concentration of such a bath.

26 Claims, No Drawings

PALLADIUM COMPLEX SALT AND USE THEREOF FOR ADJUSTING PALLADIUM CONCENTRATION OF AN ELECTROLYTIC SOLUTION FOR DEPOSIT OF PALLADIUM OR ONE OF ITS ALLOYS

BACKGROUND OF THE INVENTION

The present invention relates to a novel complex salt based on ethylene-diamine and palladium sulfate and to its use for adjusting the palladium concentration of an electrolysis bath for the deposition of palladium or one of its alloys.

The electrical contacts and the connectors used in the field of electronics receive, as a finish, thin layers of electroplated precious metals which have to be suitably bright, have good ductility, be non-porous and have corrosion resistance, frictional resistance and low contact resistance. Industry started by using deposits of gold hardened with small amounts of codeposited nickel or cobalt, often referred to as hard gold. Palladium is a precious metal whose deposits have a lower density (12 g/cm$^3$) than those of hard gold (17.3 g/cm$^3$); it also has a greater hardness and a lower porosity. Being less expensive, palladium and its alloys were considered suitable gold substitutes for the majority of applications. As a finish in a wide variety of applications, industry uses thin deposits (also called flash deposits) of gold on palladium or a palladium alloy. The main palladium alloys used are palladium-nickel or palladium-silver alloys. Techniques commonly used for the electroplating of palladium and its alloys are the barrel, the vibrating basket, the rack, batch metallization, high-speed continuous metallization (or jet plating) or pad metallization. Industry is constantly in search of more efficient electrolysis baths and processes. Palladium and its alloys are also used for decorative applications as an undercoat or finish.

The majority of palladium and palladium alloy baths currently on the market are ammoniacal baths most frequently containing chloride ions. These baths nevertheless have a high nuisance factor, both in terms of the operators' health and in terms of corrosion of the equipment, and they require a large number of maintenance operations.

Attempts have also been made to use non-ammoniacal baths:

The first baths of this type to have been described were pure palladium baths in very acidic media free of organic amines. They were difficult to use. In fact, at pH values of between 0 and 3, the substrates are attacked too strongly; furthermore, many of these formulations contain chlorides.

A second type consists of pure palladium or palladium alloy baths containing organic amines, which operate at 40 to 65° C., typically in a pH range of 9 to 12, i.e. under strongly alkaline conditions. At these high pH values and these temperatures, polyamines tend to evaporate appreciably and to rapidly become carbonated and produce crystals. Furthermore, under these conditions, the passivation of nickel-plated substrates is even greater than in ammoniacal baths. To overcome the lack of adherence, it is necessary to palladium-plate the substrates beforehand in a preliminary step, thereby increasing the cost price of these deposits accordingly.

A third type of bath, described in particular in patent U.S. Pat. No. 4,278,514, is a pure palladium bath containing organic amines. These baths, whose pH values are intermediate at between 3.0 and 7.0, generally contain phosphates and use a compound of the imide type, such as succinimide, as a brightening agent.

Among the organic amines used in this type of bath, ethylenediamine is particularly preferred because, as described especially in patent U.S. Pat. No. 4,278,514, it serves inter alia to complex the palladium so as to render it soluble in the electrolysis bath. Said document also envisages introducing the palladium into the electrolysis bath via an aqueous solution of a palladium/ethylenediamine complex in which each palladium atom is already complexed with two molecules of ethylenediamine.

Electrolyte formulators are well aware that the life of the baths increases with the extent to which the processes developed make it possible to avoid the rapid concentration of salts in the electrolysis baths used.

Now, electrolysis baths containing palladium complexed with ethylene-diamine have hitherto had relatively short lives because the methods of reloading these baths with metal involved introducing this metal in one of the following two ways:

- either in the form of a simple, non-complexed inorganic salt which, whether in solid or liquid form, is necessarily in a very acidic medium in order to avoid the formation of palladium hydroxide, the latter usually being very difficult if not impossible to resolubilize once it has formed;
- or in the form of water-soluble palladium, because in the form of palladium-bisethylenediamine sulfate, which is a water-soluble complex having a molar ratio [ethylenediamine]:[palladium] of about 2. In practice, this type of addition entails adding a liquor which results from the addition of an inorganic palladium salt in a very acidic medium to a solution of ethylenediamine containing at least two moles of diamine per mole of palladium.

In both cases a substantial accumulation of ions takes place during the life of the bath.

In fact:

In both cases the bath accumulates salts originating from the introduction of all the anions associated with the initial acidity of the simple inorganic salt used.

In the second case the bath also accumulates a large amount of diamine which it is unable to eliminate under the operating conditions. The electrolyte then rapidly becomes saturated with an ethylenediamine salt.

SUMMARY OF THE INVENTION

The inventors of the present invention have now developed a novel compound which makes it possible to introduce the palladium with a particularly reduced amount of counterions, and consequently to make a remarkable reduction in the ion loading of the electrolysis baths. This compound contains a reduced amount of complexing agent that is adapted so as to be very close to the amount just necessary to maintain its concentration at a stable level over time. The result of this process is considerably to improve the life of these baths.

Thus, according to a first feature, the invention relates to a novel palladium compound.

According to a second feature, the invention further relates to a process for the preparation of this compound.

According to a third feature, the invention further relates to the use of this novel compound for introducing palladium into an electrolysis bath for the electro-chemical deposition of palladium or its alloys, or for adjusting its concentration throughout the electrochemical deposition.

The invention further relates to an electrolysis bath for the deposition of palladium or its alloys, in which the palladium is introduced in the form of the novel compound forming the subject of the first feature of the invention, and in which, still with the same concern to avoid loading the electrolysis bath with salts, the other compounds are introduced in appropriately adapted forms.

More precisely, according to one of its essential characteristics, the invention relates to a complex salt of palladium sulfate and ethylenediamine which contains 31 to 41% by weight of palladium and in which the molar ratio $[SO_4]$:[Pd] is between 0.9 and 1.15 and the ratio [ethylenediamine]:[Pd] is between 0.8 and 1.2.

As explained above, by virtue of this novel compound, palladium can be introduced in a form already partially complexed with ethylenediamine into electrolysis baths for the electroplating of palladium or its alloys. The dissolution of this compound in an aqueous bath containing excess ethylenediamine corresponds only to completing the total complexation of the palladium.

The compound of the invention therefore has the advantage that the amount of sulfate introduced into the electrolysis bath is much smaller than that which would be necessary to introduce the palladium in one of the two forms of the prior art described above.

In fact, the complex used according to the prior art to introduce the palladium into the baths consisted of a water-soluble complex, namely palladium-bisethylenediamine sulfate, in which the molar ratio [ethylenediamine]:[palladium] is close to 2.

In contrast to this compound used according to the prior art, the complex of the invention consists of palladium-ethylenediamine sulfate and results from the complexation of each palladium atom with a single molecule of ethylenediamine, the molar ratio [ethylenediamine]:[palladium] being close to 1. This complex salt takes the form of a solid salt which, although virtually insoluble in water, is soluble in baths containing excess ethylenediamine. This excess ethylenediamine acts as a complexing agent to finish complexing the palladium and thereby render it soluble in the bath.

As is apparent from the details given below regarding the synthesis of the compound of the invention, the excess sulfate originating from the palladium sulfate in the form of free sulfuric acid remains in the mother liquors after precipitation of the insoluble complex salt.

Thus the complex salt of the invention contains virtually no free sulfuric acid.

DETAILED DESCRIPTION OF THE INVENTION

The compound of the invention takes the form of a yellow-colored salt and contains approximately 31 to 41% by weight of palladium and a particularly small amount of sulfate since the ratio of the molar concentrations of sulfate and palladium is between 0.9 and 1.15. Furthermore, the amount of ethylenediamine contained in the compound of the invention is also particularly small since the molar concentration of ethylenediamine in the compound of the invention is very similar to the molar concentration of palladium, being more precisely between 0.8 and 1.2.

As explained above and as is also apparent from the description which follows, the compound of the invention is particularly valuable for adjusting the palladium concentration of a bath for the electroplating of palladium or its alloys.

Thus, according to another of these features, the invention relates to a process for the preparation of the product of the invention.

More precisely, this process comprises reacting a solution of ethylene-diamine with a solution of palladium sulfate in a molar ratio [ethylenediamine]:[palladium] of between 0.8 and 1.2. This reaction is advantageously carried out at ambient temperature for at least 12 hours.

The palladium sulfate used in the above reaction is advantageously obtained from a solution of palladium nitrate by adding sulfuric acid in a molar ratio $[H_2SO_4]$:[Pd] of between 1 and 1.7. On completion of this palladium nitrate/sulfuric acid reaction step, a mixture consisting of nitric acid and water is removed by distillation.

The residue is then advantageously evaporated to dryness and subsequently redissolved in water to be converted to palladium sulfate.

The palladium sulfate solution is then mixed with an ethylenediamine solution in proportions such that the molar ratio ethylenediamine:palladium is between 0.8 and 1.2.

The mixture is then advantageously agitated at ambient temperature for at least 12 hours and subsequently subjected to a filtration and drying operation, after which the product of the invention is recovered.

According to another of its essential characteristics, the invention relates to the use of the complex salt according to the invention, composed of palladium sulfate and ethylenediamine, or the product obtained by the process described above, for introducing palladium into an aqueous electrolysis bath of acidic pH for the electrochemical deposition of palladium or its alloys, or for adjusting the palladium concentration of said bath.

As explained above, the use of this novel compound for introducing palladium into the bath has the dual advantage of using a much smaller amount of counterions than in the prior art; this avoids loading the bath unnecessarily with salt and consequently makes it possible to prolong its life.

Furthermore, another advantage of the compound used according to the invention for introducing palladium is not only that the anion is present in a small amount relative to that used according to the prior art, but also that the anion is sulfate, which reacts at the electrodes much less readily than nitrite or sulfite ions, whose concentrations are much more difficult to maintain at a stable level in the electrolytes. Sulfates are also particularly valued in the field of electroplating because it is well known that, in contrast to chloride anions, they do not corrode stainless steel.

Thus, using the compound of the invention to introduce palladium has two advantages. On the one hand, it makes it possible to improve the life of the electrolysis baths by avoiding their saturation with salts. On the other hand, it makes it possible to avoid the introduction of anions that are corrosive towards the electroplating equipment used.

Another advantage of using the compound of the invention in baths for the deposition of palladium or its alloys is that it makes it possible almost completely to eliminate additions of complexing agent over the lifetime of the bath, since it is introduced directly in the palladium compound in just the amount required to keep its concentration stable. Maintenance of the baths is therefore simplified in comparison with the case where the palladium concentration is maintained by means of palladium sulfate and in which substantial additions of complexing agent have to be controlled by analytical monitoring.

In electroplating processes which employ a bath incorporating the novel compound of the invention, the ethylenediamine is preferably present in a sufficient amount to complex the palladium and render it soluble in said bath, preferably at a concentration of between 2 and 200 ml/l.

The baths in question are very particularly baths for the deposition of either pure palladium or palladium alloys, the latter being baths which contain, apart from palladium, at least one compound of a so-called secondary metal to be codeposited in the form of an alloy with the palladium.

In one advantageous variant of the invention, the baths in question contain from 1 to 100 g/l of palladium.

The baths for depositing an alloy of palladium and a secondary metal preferably contain, as the secondary metal, at least one metal selected from the group consisting of nickel, cobalt, iron, indium, gold, silver and tin.

The secondary metal is advantageously present in the bath at a concentration of between 0.1 and 60 g/l.

As indicated above, the baths to which the present invention relates are electrolysis baths operating at an acidic pH, advantageously at a weakly acidic pH and preferably at a pH of between 3 and 5. In fact, in this pH range, the baths of the invention prove particularly stable. This pH range is particularly suitable for baths containing nickel or cobalt, whose hydroxides would be likely to precipitate at pH values of between 6 and 7, and makes it possible to avoid obtaining cloudy deposits, as is the case for certain baths with a pH of between 5 and 6.

In the preferred pH range between 3 and 5, the brightness of the deposits obtained is generally enhanced by the presence of a secondary metal acting as an inorganic brightening agent, in a manner analogous to that observed in acidic gold baths.

These baths also advantageously contain an organic brightening agent.

The organic brightening agent used is advantageously 3-(3-pyridyl)acrylic acid, 3-(3-quinolyl)acrylic acid or one of their salts, preferably an alkali metal salt, for example a sodium or potassium salt. The use of these brightening agents in baths for the electroplating of palladium or palladium alloys in which the palladium is complexed with ethylenediamine forms the subject of a patent application filed on the same date as the present patent application.

Furthermore, these electrolysis baths also advantageously contain a metal, particularly nickel, cobalt, iron, indium, gold, silver or tin, acting as an inorganic brightening agent.

Finally, still with the same concern to avoid corroding the electroplating installations and at the same time to avoid loading the bath with salts, if the bath contains, apart from palladium, a secondary alloying metal or a metal acting as an inorganic brightening agent, this metal will advantageously be introduced in the form of the sulfate, hydroxide or carbonate or a mixture thereof.

When one or more alloying metals are codeposited, i.e. consumed, it has been found most appropriate to reload the baths with carbonates. In fact, carbonates react in acidic media to form $CO_2$, which rapidly escapes in gaseous form at the time of addition.

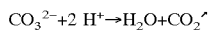

$$CO_3^{2-} + 2 H^+ \rightarrow H_2O + CO_2\uparrow$$

This reaction takes place when the metal carbonate is added to the electrolyte. With this system the secondary metals can be readjusted without adding anions to the bath. This system makes it possible to prolong the life of the baths of the present invention.

Another way of introducing the secondary metals when the baths are reloaded consists in introducing them in the form of their hydroxides.

The secondary metals may also be introduced in the form of the sulfates.

Thus, using the baths of the invention therefore makes it possible at the same time to prolong the life of the electroplating equipment by preventing its corrosion.

Furthermore, the electrolysis baths of the invention can contain various additives conventionally used in electroplating baths, such as conducting salts, buffers for stabilizing the pH, wetting agents and additives for reducing the internal voltages of the electrolytic deposits on the surface to be coated.

These various additives will advantageously be chosen so as not to introduce unwanted ions into the electrolysis bath and particularly so as not to introduce either chloride or phosphoric acid into the electrolysis bath.

Thus the baths of the invention advantageously contain at least 20 g/l of at least one conducting salt. This conducting salt will advantageously be selected from the group consisting of sodium sulfate, potassium sulfate and mixtures thereof.

The buffers for stabilizing the pH will preferably be of the acetic, citric, boric, lactic, malic, phthalic, acrylic, tartaric, oxalic or succinic type.

Wetting agents will advantageously be used. The preferred wetting agents according to the invention will be cetyltrimethylammonium bromide or iodide.

To avoid the internal voltages of the deposits, sodium saccharinate will advantageously be incorporated in the electrolysis bath.

In different variants which are particularly advantageous, the invention proposes conditions under which, in particular, the use of chlorides can be totally avoided.

The invention therefore proposes a set of conditions which attach to the use of the novel compound and cooperate to give an electrolysis bath which does not exhibit the deficiencies of the baths of the prior art as regards corrosion of the electroplating devices, and at the same time aims to achieve conditions whereby the amount of salts in the baths can be minimized.

These conditions work together to give baths for the electroplating of palladium or its alloys which make it possible to use current densities of between 0.5 and 150 A/dm².

It has thus been possible to produce baths which can therefore be used in high-speed electroplating processes with current densities analogous to or even higher than those used in the most efficient ammoniacal baths. For such applications, it has been possible to produce bright deposits of 0.1 to 6 μm at current densities of between 0.5 and 150 A/dm².

However, the baths of the invention can also be used at lower speeds and current densities, particularly in decorative applications.

There is no formation of insoluble salt on platinized titanium anodes. This feature makes it possible to envisage applications of the jet plating type and especially continuous selective metallizations, for example pad metallization.

In the electroplating process of the invention, the anodes are insoluble anodes preferably made of platinized titanium, platinum coated with iridium oxide, or a precious metal such as platinum. Furthermore, the cathode consists of a metallized substrate.

The preferred formulations of baths according to the present invention can be described (without implying a limitation) by the following general composition, in which the concentrations of metal derivatives (palladium and alloying metals) are based on the metal and in which the palladium is introduced in the form of a palladium sulfate/ethylenediamine compound with molar ratios [SO₄]:[Pd]

and [ethylenediamine]:[Pd] of 0.9 to 1.15 and 0.8 to 1.2 respectively:

| | |
|---|---|
| Palladium | 1 to 100 g/l |
| Alloying metal selected from Ni, Co, Fe, In, Au, Ag and Sn | 0 to 60 g/l |
| Ethylenediamine | 2 to 200 ml/l |
| 3-(3-Pyridyl)acrylic acid or 3-(3-quinolyl) acrylic acid | 0.01 to 3 g/l |
| Sodium sulfate | >20 g/l |
| The operating conditions are advantageously as follows: | |
| pH | 3 to 5 |
| Temperature | 10 to 75° C. |
| Agitation | moderate to very vigorous |
| Current density | 0.5 to 150 A/dm$^2$ |
| Anode | platinized titanium |

EXAMPLES

Example A
Preparation of a Compound According to the Invention

The compounds of the invention, hereafter referred to as compounds A, are prepared by the following procedure:

Starting material: an acidic solution of palladium nitrate

Addition of sulfuric acid in a molar ratio [H$_2$SO$_4$]:palladium of 1.0 to 1.7

Distillation of a mixture of water and nitric acid

Evaporation to dryness

Redissolution of the palladium sulfate in water

Addition to a dilute solution of ethylenediamine in a molar ratio [ethylenediamine]:[palladium] of 0.8 to 1.2

Reaction time at ambient temperature, with agitation: >12 h

Filtration, drying

The yellow-colored complex salt of palladium sulfate and ethylenediamine contains approximately 31 to 41% by weight of palladium and has molar ratios [SO$_4$]:[Pd] and [ethylenediamine]:[Pd] of 0.9 to 1.15 and 0.8 to 1.2 respectively.

It is this compound, hereafter called compound A, which will subsequently be used in the Examples of part B to introduce palladium or readjust its concentration during the operation of the baths described.

Example B
Electrolysis Baths

Examples 1 to 6 which follow illustrate the good performance characteristics of the baths of the invention.

In all these Examples the substrate to be metallized is prepared by an appropriate procedure that depends on the nature of the metal. For example, copper or nickel substrates are first degreased electrolytically; after rinsing with water, the substrate is depassivated in dilute sulfuric acid of 5–20% by volume and rinsed with deionized water before being immersed in one of the electrolytes of the invention.

Certain additives may optionally be introduced. Thus:

Sodium sulfate can be used as a conducting salt, but it is also possible to use potassium sulfate or a mixture of both salts.

An acetic, citric or boric buffer, or any other buffer system which is effective over the pH range in question, can be used to stabilize the pH of the bath.

A wetting agent can be added to avoid the pitting caused by the release of hydrogen on the pieces. A cationic or non-ionic wetting agent is suitable, it being possible, for example, to use very small amounts of cetyltrimethylammonium iodide or bromide.

A stress reducer may be added for decorative applications, it being possible in certain cases to add very small amounts of sodium saccharinate.

Example 1
High-speed Palladium Bath

| | |
|---|---|
| Palladium (introduced in the form of compound A) | 17 to 23 g/l |
| Nickel (in the form of sulfate) | 0.2 to 0.5 g/l |
| Ethylenediamine | 55 to 75 ml/l |
| Trans-3-(3-pyridyl)acrylic acid | 0.22 to 0.38 g/l |
| Sodium sulfate | 20 to 50 g/l |
| Operating conditions: | |
| pH (sulfuric acid/sodium hydroxide) | 3.5 to 4.5 |
| Temperature | 40 to 75° C. |
| Agitation | vigorous to very vigorous |
| Current density | 5 to 42 A/dm$^2$ |
| Anode | platinized titanium |

This bath, in which the nickel acts solely as a brightening agent, deposits palladium with a purity of more than 99.9%; the deposit is mirror-bright, white and ductile with a low resistivity, a low porosity and a good corrosion resistance.

Example 2
High-speed Palladium-nickel Bath

| | |
|---|---|
| Palladium (introduced in the form of compound A) | 17 to 23 g/l |
| Nickel (in the form of sulfate) | 9.0 to 13.0 g/l |
| Ethylenediamine | 55 to 75 ml/l |
| Trans-3-(3-pyridyl)acrylic acid | 0.22 to 0.38 g/l |
| Sodium sulfate | 20 to 50 g/l |
| Operating conditions: | |
| pH (sulfuric acid/sodium hydroxide) | 3.5 to 4.5 |
| Temperature | 60 to 75° C. |
| Agitation | vigorous to very vigorous |
| Current density | 21 to 56 A/dm$^2$ |
| Anode | platinized titanium |

The mean results are as follows:

| | |
|---|---|
| Deposition rate at 70° C. and 28 A/dm$^2$ | 1 μm in 10 seconds |
| Deposition rate at 70° C. and 42 A/dm$^2$ | 1 μm in 7 seconds |
| Deposition rate at 70° C. and 56 A/dm$^2$ | 1 μm in 5 seconds |
| Cathode efficiency at 70° C. and 56 A/dm$^2$ | 87.2% |

This bath deposits the alloy palladium 80%-nickel 20%. The 0.1 to 6 μm deposit is mirror-bright and ductile with a low contact resistance and a Vickers hardness of 390 HV under 100 gf (measured according to ISO 4516 (1980)). The deposits, checked according to ISO 4524/3 (85), are non-porous, have a good corrosion resistance and, for a thickness of 0.5 to 6 μm, satisfy the CASS TEST defined by ISO 9227 (1990). They also have a good frictional resistance and pass the BRITISH TELECOM test.

Example 3
High-speed Palladium-cobalt Bath

| | |
|---|---|
| Palladium (introduced in the form of compound A) | 17 to 23 g/l |
| Cobalt (in the form of sulfate) | 6.0 to 9.0 g/l |
| Ethylenediamine | 55 to 75 ml/l |
| Trans-3-(3-pyridyl)acrylic acid | 0.22 to 0.38 g/l |
| Sodium sulfate | 20 to 50 g/l |
| Operating conditions: | |
| pH (sulfuric acid/sodium hydroxide) | 3.5 to 4.5 |
| Temperature | 60 to 75° C. |
| Agitation | vigorous to very vigorous |
| Current density | 21 to 56 A/dm$^2$ |
| Anode | platinized titanium |

This bath deposits the alloy palladium 75%-cobalt 25%. The 0.1 to 6 μm deposit is mirror-bright, ductile and hard with a low contact resistance. The deposits are non-porous and have a good corrosion resistance and frictional resistance.

Example 4
Palladium Bath for Decorative Purposes

| | |
|---|---|
| Palladium (introduced in the form of compound A) | 17 to 23 g/l |
| Nickel (in the form of sulfate) | preferably 0.01 to 0.5 g/l |
| Ethylenediamine | 55 to 75 ml/l |
| Trans-3-(3-pyridyl)acrylic acid | 0.10 to 0.38 g/l |
| Sodium sulfate | 20 to 50 g/l |
| Operating conditions: | |
| pH (sulfuric acid/sodium hydroxide) | 3.5 to 4.5 |
| Temperature | 30 to 75° C. |
| Agitation | moderate |
| Current density | 0.5 to 5 A/dm$^2$ |
| Anode | platinized titanium |

This bath, in which the nickel acts solely as a brightening agent, deposits palladium with a purity of >99.9%. The 0.2 to 6 μm deposit is mirror-bright, white, ductile and free of cracks. The deposits are non-porous and have a good corrosion resistance and frictional resistance.

Example 5
Palladium-nickel Bath for Decorative Purposes

| | |
|---|---|
| Palladium (introduced in the form of compound A) | 6 to 9 g/l |
| Nickel (in the form of sulfate) | 18.0 to 22.0 g/l |
| Ethylenediamine | 55 to 75 ml/l |
| Trans-3-(3-pyridyl)acrylic acid | 0.02 to 0.15 g/l |
| Sodium sulfate | 20 to 50 g/l |
| Operating conditions: | |
| pH (sulfuric acid/sodium hydroxide) | 3.5 to 4.5 |
| Temperature | 55 to 65° C. |
| Agitation | moderate |
| Current density | 1 to 5 A/dm$^2$ |
| Anode | platinized titanium |

This bath deposits the alloy palladium 80%-nickel 20%. The 0.2 to 6 μm deposit is mirror-bright, white, ductile and free of cracks. The deposits are non-porous and have a good corrosion resistance and frictional resistance.

Example 6
Palladium-cobalt Bath for Decorative Purposes

| | |
|---|---|
| Palladium (introduced in the form of compound A) | 10 to 14 g/l |
| Cobalt (in the form of sulfate) | 7.5 to 8.5 g/l |
| Ethylenediamine | 55 to 75 ml/l |
| Trans-3-(3-pyridyl)acrylic acid | 0.02 to 0.15 g/l |
| Sodium sulfate | 20 to 50 g/l |
| Operating conditions: | |
| pH (sulfuric acid/sodium hydroxide) | 3.5 to 4.5 |
| Temperature | 20 to 45° C. |
| Agitation | moderate |
| Current density | 1 to 8 A/dm$^2$ |
| Anode | platinized titanium |

This bath deposits the alloy palladium 70%-cobalt 30% for decorative applications. The 0.2 to 6 μm deposit is mirror-bright, ductile and free of cracks. The deposits are non-porous and have a good corrosion resistance and frictional resistance.

Example C
Illustration of the Improvement in the Life of the Baths

To illustrate the value of using the compound of the invention in the case of a bath corresponding to that of Example 2 above, over a period of use corresponding to 10 cycles, i.e. to the deposition of 10 times the amount of palladium initially in this bath (this amount therefore corresponds to the deposition of 200 g of palladium in the case of a bath containing 20 g/l of palladium), Examples a and b below were carried out, Comparative Example a deliberately being favored by the imposition of greater bath losses through entrainment.

a) Comparative Example

Readjustment is effected in this Example with the following ingredients:
  concentrated palladium sulfate (free acidity of 1 to 1.2 mol of free sulfuric acid per mol of palladium),
  solution of nickel sulfate,
  ethylenediamine.

In this case the electrolysis was performed with a bath loss through entrainment of 10 to 12% for a palladium deposit corresponding to the amount of palladium initially in the bath.

Despite these conditions, monitoring of the change in the density of the bath as a function of its life showed that, with this mode of maintenance and even with substantial entrainment, the electrolyte rapidly reaches salt saturation after 7 cycles. This corresponds to a density of 1.27 to 1.3 at 25° C. A cold filtration is necessary to continue electroplating with such a bath.

Furthermore, the additions of ethylenediamine are substantial and need to be precisely monitored in order to keep the ethylenediamine concentration constant in the bath.

b) Example According to the Invention

The readjustment in this Example is effected with the following ingredients:
  complex salt according to the invention,
  basic nickel carbonate,
  ethylenediamine.

In this case the electrolysis was performed with a bath loss through entrainment of 3 to 5% by volume per cycle, i.e. under conditions of small volume losses that in practice cause only a slight decrease in the density of the bath.

Despite these conditions, it was demonstrated that the addition of ethylenediamine corresponds simply to the losses through entrainment, i.e. it is very small, and very infrequent monitoring suffices to the extent that the bath can operate for several cycles without an addition of ethylenediamine.

The density of the bath remains constant (d=1.14) after 10 cycles, whereas the losses through entrainment are very much smaller (3 to 5% instead of 10 to 12% by volume) than in the case of the Comparative Example.

In conclusion, these results clearly demonstrate the value of using the palladium/ethylenediamine complex salt of the invention and, in a wider context, the overall system for maintaining the baths of the invention.

What is claimed is:

1. A complex salt of palladium sulfate and ethylenediamine, comprising 31 to 41% by weight of palladium and having a molar ratio $[SO_4]$:[Pd] of between 0.9 and 1.15 and a molar ratio [ethylenediamine]:[Pd] of between 0.8 and 1.2.

2. A process for the preparation of the complex salt according to claim 1 comprising reacting a solution of ethylenediamine with a solution of palladium sulfate in a molar ratio [ethylenediamine]:[Pd] of between 0.8 and 1.2, said reaction being carried out at ambient temperature for at least 12 hours.

3. The process according to claim wherein said palladium sulfate is obtained from a solution of palladium nitrate by the addition of sulfuric acid in a molar ratio $[H_2SO_4]$:[Pd] of between 1 and 1.7, followed by a step for the removal of a mixture of water and nitric acid.

4. A method for electrochemical deposition of palladium or an alloy thereof from an aqueous electrolysis bath, or for adjusting the palladium concentration of an aqueous electrolysis bath, comprising introducing a complex salt of palladium sulfate and ethylenediamine, comprising 31 to 41% by weight of palladium and having a molar ratio $[SO_4]$:[Pd] of between 0.9 and 1.15 and a molar ratio [ethylenediamine]:[Pd] of between 0.8 and 1.2 into said aqueous electrolysis bath of acidic pH, wherein said bath contains from 2 to 200 ml/l of ethylenediamine, and depositing palladium or an alloy thereof from said aqueous electrolysis bath by electrochemical deposition.

5. The method according to claim 4, wherein said acidic pH is between 3 and 5.

6. The method according to claim 4, wherein said acidic pH is stabilized by means of a buffer.

7. The method according to claim 4, wherein said electrolysis bath contains ethylenediamine in a sufficient amount to complex the palladium and render the palladium soluble in said bath.

8. The method according to claim 4, wherein said bath contains from 1 to 100 g/l of palladium.

9. The method according to claim 4, wherein said bath contains a compound of at least one secondary metal to be codeposited in the form of an alloy with the palladium, said secondary metal being selected from the group consisting of nickel, cobalt, iron, indium, gold, silver and tin, at a concentration of between 0.1 and 60 g/l.

10. The method according to claim 9, wherein said secondary metal is introduced into said bath in the form of a carbonate, sulfate, hydroxide or a mixture thereof.

11. The method according to claim 4, wherein said bath contains a metal acting as an inorganic brightening agent.

12. The method according to claim 11, wherein said metal acting as an inorganic brightening agent is introduced into said bath in the form of a carbonate, sulfate, hydroxide or a mixture thereof.

13. The method according to claim 4, wherein said bath contains an organic brightening agent.

14. The method according to claim 13, wherein said brightening agent is 3-(3-pyridyl)acrylic acid, 3-(3-quinolyl) acrylic acid or a salt thereof.

15. A method for electrochemical deposition of palladium or an alloy thereof from an aqueous electrolysis bath, or for adjusting the palladium concentration of an aqueous electrolysis bath, comprising introducing into said aqueous electrolysis bath of acidic pH a complex salt of palladium sulfate and ethylenediamine obtained by reacting a solution of ethylenediamine with a solution of palladium sulfate in a molar ratio [ethylenediamine]:[Pd] of between 0.8 and 1.2, said reaction being carried out at ambient temperature for at least 12 hours, and depositing palladium or an alloy thereof from said aqueous electrolysis bath by electrochemical deposition.

16. The method according to claim 15, wherein said acidic pH is between 3 and 5.

17. The method according to claim 15, wherein said acidic pH is stabilized by means of a buffer.

18. The method according to claim 15, wherein said electrolysis bath contains ethylenediamine in a sufficient amount to complex the palladium and render the palladium soluble in said bath.

19. The method according to claim 18, wherein said bath contains from 2 to 200 ml/l of ethylenediamine.

20. The method according to claim 15, wherein said bath contains from 1 to 100 g/l of palladium.

21. The method according to claim 15, wherein said bath contains a compound of at least one secondary metal to be codeposited in the form of an alloy with the palladium, said secondary metal being selected from the group consisting of nickel, cobalt, iron, indium, gold, silver and tin, at a concentration of between 0.1 and 60 g/l.

22. The method according to claim 21, wherein said secondary metal is introduced into said bath in the form of a carbonate, sulfate, hydroxide or a mixture thereof.

23. The method according to claim 15, wherein said bath contains a metal acting as an inorganic brightening agent.

24. The method according to claim 23, wherein said metal acting as an inorganic brightening agent is introduced into said bath in the form of a carbonate, sulfate, hydroxide or a mixture thereof.

25. The method according to claim 15, wherein said bath contains an organic brightening agent.

26. The method according to claim 25, wherein said brightening agent is 3-(3-pyridyl)acrylic acid, 3-(3-quinolyl) acrylic acid or a salt thereof.

* * * * *